(12) United States Patent
Morita

(10) Patent No.: US 12,067,706 B2
(45) Date of Patent: Aug. 20, 2024

(54) VENEER SORTING CONTROL DEVICE, VENEER SORTING CONTROL METHOD, AND PROGRAM FOR VENEER SORTING CONTROL

(71) Applicant: Meinan Machinery Works, Inc., Obu-shi (JP)

(72) Inventor: Koji Morita, Obu (JP)

(73) Assignee: Meinan Machinery Works, Inc., Obu (JP)

( * ) Notice: Subject to any disclaimer, the term of this patent is extended or adjusted under 35 U.S.C. 154(b) by 434 days.

(21) Appl. No.: 17/607,624

(22) PCT Filed: Oct. 20, 2020

(86) PCT No.: PCT/JP2020/039406
§ 371 (c)(1),
(2) Date: Oct. 29, 2021

(87) PCT Pub. No.: WO2021/085243
PCT Pub. Date: May 6, 2021

(65) Prior Publication Data
US 2022/0215527 A1 Jul. 7, 2022

(30) Foreign Application Priority Data
Oct. 31, 2019 (JP) .................. 2019-198330

(51) Int. Cl.
*G06T 7/00* (2017.01)
*B27D 1/00* (2006.01)
*G05B 15/02* (2006.01)
(52) U.S. Cl.
CPC .............. *G06T 7/0004* (2013.01); *B27D 1/00* (2013.01); *G05B 15/02* (2013.01); *G06T 2207/30161* (2013.01)

(58) Field of Classification Search
CPC . G06T 7/90; G06T 3/60; H04N 23/90; H04N 23/10; B27G 1/00; B27D 1/10
See application file for complete search history.

(56) References Cited

U.S. PATENT DOCUMENTS 6,505,658 B2 * 1/2003 Koba ................ B27D 1/005
492/30
6,752,887 B2 * 6/2004 Runge ................ B27D 1/10
156/64

(Continued)

FOREIGN PATENT DOCUMENTS

EP 3508315 A1 7/2019
JP 2014-205306 A 10/2014

OTHER PUBLICATIONS

Supplementary European Search Report issued on Oct. 25, 2023 for corresponding European Application No. 20881713.

*Primary Examiner* — Yosef Kassa
(74) *Attorney, Agent, or Firm* — POLSINELLI PC

(57) ABSTRACT

Provided is a veneer sorting control device including: a sorting condition setting unit 11 that sets sorting conditions for each of a plurality of kinds of defects so as to sort a veneer into a plurality of quality ranks; a defect detection unit 13 that detects the plurality of kinds of defects with respect to each of a plurality of pieces of veneer image data acquired from an image storage unit 100; a quality rank sorting unit 14 that sorts a plurality of the veneers into a plurality of quality ranks in correspondence with the sorting conditions which are set and defect detection states; a first totalization unit 15 that totalizes the number or a number ratio of the veneers in the plurality of quality ranks which are sorted; and a display control unit 17 that displays the totalization result on a screen. The number of the veneers (Continued)

sorted into the plurality of quality ranks can be confirmed by a simulation using the veneer image data stored in the image storage unit 100.

9 Claims, 6 Drawing Sheets

(56) References Cited

U.S. PATENT DOCUMENTS

| | | | | |
|---|---|---|---|---|
| 7,438,096 B2* | 10/2008 | Holbert | ............... | B27G 1/00 |
| | | | | 144/162.1 |
| 8,157,622 B2* | 4/2012 | Ali | ............... | B24D 15/04 |
| | | | | 451/523 |
| 8,253,793 B2* | 8/2012 | Hiraoka | ............... | B27G 1/00 |
| | | | | 348/91 |
| 8,263,793 B2* | 9/2012 | Caron | ............... | C07D 305/14 |
| | | | | 560/116 |
| 8,438,096 B1* | 5/2013 | Fashenpour | ............... | G06Q 40/00 |
| | | | | 705/36 R |
| 8,747,987 B2* | 6/2014 | Yu | ............... | B32B 7/12 |
| | | | | 428/105 |
| 10,825,164 B1* | 11/2020 | Bolton | ............... | H04N 23/90 |
| 2005/0147286 A1 | 7/2005 | Lee et al. | | |
| 2006/0262972 A1 | 11/2006 | Hiraoka | | |

* cited by examiner

Fig. 2

| KINDS OF DEFECTS | QUALITY RANKS | | | | |
|---|---|---|---|---|---|
| | Min | A | B | C | |
| HOLES AND KNOT HOLES (LONGITUDINAL DIAMETER) | 5 | 30 | 50 | 80 | mm |
| HOLES AND KNOT HOLES (SHEET WIDTH DIAMETER) | 5 | 30 | 50 | 80 | mm |
| HOLES AND KNOT HOLES (NUMBER) | — | 10 | 45 | 150 | PIECES |
| PINHOLES (NUMBER) | — | 70 | 85 | 500 | PIECES |
| KNOTS (LONGITUDINAL DIAMETER) | 5 | 50 | 75 | 100 | mm |
| KNOTS (SHEET WIDTH DIAMETER) | 5 | 50 | 75 | 100 | mm |
| KNOTS (NUMBER) | — | 30 | 70 | 160 | PIECES |
| ... | ... | ... | ... | ... | |

VENEER SORTING CONTROL DEVICE, VENEER SORTING CONTROL METHOD, AND PROGRAM FOR VENEER SORTING CONTROL

CROSS REFERENCE TO RELATED APPLICATIONS

This application is a National Phase filing under 35 U.S.C. § 371 of PCT/JP2020/039406 filed on Oct. 20, 2020; which application in turn claims priority to Application No. 2019-198330 filed in Japan on Oct. 31, 2019. The entire contents of each application are hereby incorporated by reference.

TECHNICAL FIELD

The present invention relates to a veneer sorting control device, a veneer sorting control method, and a program for a veneer sorting control, and particularly, to a technology of sorting a veneer produced from log into a plurality of quality ranks in correspondence with a defect state.

BACKGROUND ART

Generally, a veneer for producing a thin wooden board that is plywood or a veneer-laminated material is produced by cutting log that is a natural object with a veneer lathe. For example, the plywood is manufactured by laminating a plurality of veneers produced from log and by bonding the veneers with an adhesive. The veneers produced from the log have various kinds of defects. Individual veneers are sorted into any one among a plurality of quality ranks in accordance with the kind, the magnitude, the number, or the like of the defects. In addition, the veneers may foe allocated to any one of a veneer that is used as a face veneer, a veneer, that is used as a back veneer, and a veneer that is used as a core veneer hidden between the face veneer and the back veneer in the plywood in correspondence with the quality ranks.

Note that, there is known a system that detects a plurality of kinds of defects (corner chipping, mold discoloration, cracks, saw marks, knots, blackness, worn holes and beetle holes, pinholes, resin pockets, rot, mark by cutting edge chipping, reaction wood, cracks along annual rings, cracks along the grain of wood, delamination, against grain, bark, liana marks, color change, pressure bar opening clogging, pressure bar opening dust, and the like) of the veneers, and selectively deposits the veneers after determining the grade of the veneers in correspondence with the overall degree of defects (for example, refer to Patent Document 1). Patent Document 1 discloses determination as to whether the grade is a grade capable of being used as a face veneer of plywood, a grade capable of being used as a back veneer thereof, a grade capable of being used as a core veneer thereof, or a grade that is insufficient in dimensions or needs repairing. In addition. Patent Document 1 also discloses that determination parameters (threshold values for determination as defects) can be adjusted for a plurality of determination items corresponding to respective kinds of defects.
Patent Document 1: JP-A-2014-205306

SUMMARY OF THE INVENTION

Technical Problem

In the system disclosed in Patent Document 1, when strict condition values are set for the determination parameters for detection as defects, the number of veneers which are sorted into a high-quality grade capable of being used as the face veneer decreases, and the number of veneers which are sorted into a middle-quality grade for use as the back veneer or a low-quality grade for use as the core veneer increases in accordance with the decrease. In contrast, when loose condition values are set for the determination parameters, the number of veneers which are sorted into the high-quality grade capable of being used as the face veneer increases, and the number of veneers which are sorted into the middle-quality grade for use as the back veneer or the low-quality grade for use as the core veneer decreases in accordance with the increase. That is, even when the kind, the magnitude, the number, or the like of the defects of the veneers is the same in each case, the grades for sorting the veneers vary in accordance with determination parameter values which are set.

A veneer that is sorted into any one grade can be allocated to any one of the face veneer, the back veneer, and the core veneer, but it is necessary to perform the sorting so that veneers in each grade are sorted in an optimal amount so as to efficiently manufacture plywood. In addition, it is necessary to appropriately set determination parameters of respective determination items while considering that with regard to grade sorting, what kind of defect, will be emphasized to a certain extent in correspondence with the use of the plywood (for example, a final product manufactured by using the plywood). That is, it is necessary to appropriately set the determination parameters of respective determination items after considering balance between adjustment relating to quality management in which what kind and what degree of defect will be sorted to which grade, and adjustment relating to ratio management of the number of veneers which are sorted into respective grades as overall evaluation.

However, in the case of using the system described in Patent Document 1, the determination parameters are initially set, a plurality of veneers which are actually produced are sorted into a plurality of grades, an operator confirms whether or not setting of the determination parameters is appropriate with reference to a sorting result, and when the setting is not appropriate, it is necessary to repetitively perform the work of adjusting the determination parameters until the sorting result becomes appropriate. Therefore, there is a problem that it takes a lot of time to adjust the determination parameters for appropriately sorting the plurality of produced veneers into respective grades.

The invention has been made to solve the problem, and an object thereof is to perform adjustment of sorting conditions for appropriately sorting a plurality of veneers to foe produced into a plurality of quality ranks within a short time.

Solution to Problem

To accomplish the above-described object, according to the invention, a plurality of pieces of veneer image data are acquired from an image storage unit that stores the plurality of pieces of veneer image data obtained by imaging surfaces in which a defect exists with respect to a plurality of veneers, and a plurality of kinds of defects are detected with respect to the plurality of pieces of veneer image data. In addition, on the basis of detection states of the defects, in accordance with a sorting condition that is set for each of the plurality of kinds of defects, a quality rank for each of the plurality of kinds of defects is determined with respect to the plurality of pieces of veneer image data, the quality rank for each defect is determined overall, and the veneers corresponding to the plurality of pieces of veneer image data are respectively sorted into a plurality of quality ranks. In addition, the numbers or number ratios of the veneers corresponding to the plurality of quality ranks sorted with respect to the plurality of veneer image data are totalized, and the totalization result is displayed on a screen.

Advantageous Effects of the Invention

According to the invention configured as described above, detection of defects and sorting of veneers into respective quality ranks are performed by using the plurality of pieces of veneer image data stored in the image storage unit, and the numbers or the number ratios of the veneers of the respective quality ranks which are totalized by using the sorting result are displayed on a screen. In addition, in a case where it is determined that the number ratios of the veneers which are confirmed through the screen display are not appropriate, after sorting conditions are adjusted while considering that which hind of defect is emphasized to a certain extent, detection of the defects and sorting of the veneers into the respective quality ranks are performed again by using the plurality of pieces of veneer image data, and the numbers or number ratios of the veneers of the respective quality ranks are displayed on the screen. Accordingly, an adjustment result of the sorting conditions can be confirmed.

As described above, according to the invention, it is not necessary to sequentially sort a plurality of veneers which are actually produced into a plurality of quality ranks, adjust sorting conditions for defects by an operator with reference to the sorting result, and then perform work of confirming whether or not sorting of the plurality of veneers which are actually produced under the adjusted sorting conditions into the respective quality ranks is appropriately performed, and adjustment of the sorting conditions can be performed by only processing on a computer with respect to the plurality of pieces of veneer image data stored in the image storage unit. According to this, adjustment of the sorting conditions for appropriately sorting the plurality of veneers to be produced into the plurality of quality ranks can be performed within a short time.

BRIEF DESCRIPTION OF THE DRAWINGS

FIG. 2 is a view illustrating a sorting condition setting example (part) for every defect by a sorting condition setting unit.

MODE FOR CARRYING OUT THE INVENTION

First Embodiment

Figure 1:
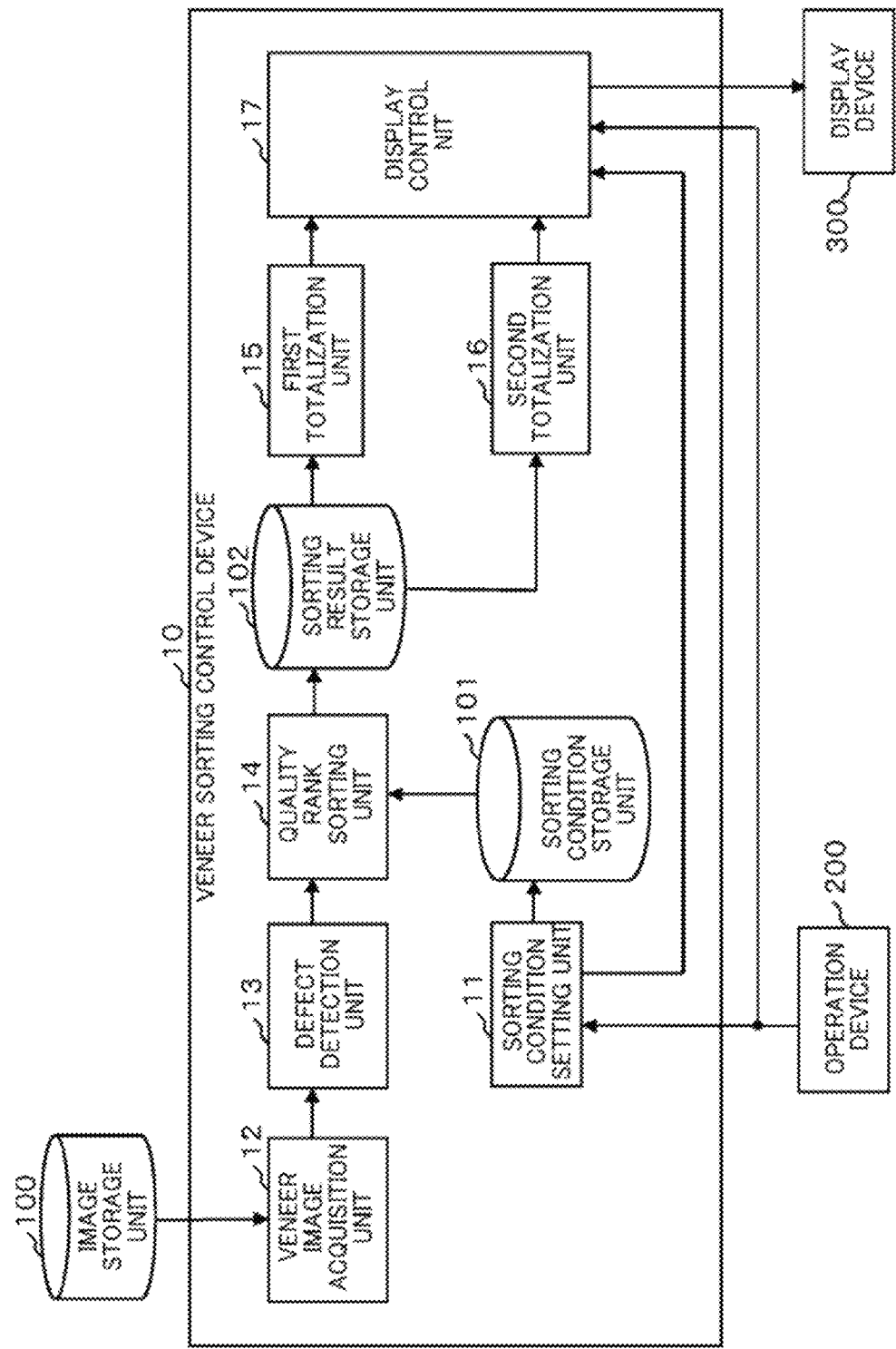
FIG. 1 is a block diagram illustrating a functional configuration example of a veneer sorting control device according to a first embodiment.

Hereinafter, a first embodiment according to the invention will be described with reference to the accompanying drawings. FIG. 1 is a block diagram illustrating a functional configuration example of a veneer sorting control device according to the first embodiment. A veneer sorting control device 10 according to the first embodiment is mounted as a terminal such as a personal computer provided in a veneer manufacturing factory, a management office, or the like, or as a server that is accessible from the terminal through a communication network such as the Internet.

As illustrated in FIG. 1, the veneer sorting control device 10 according to the first embodiment includes a sorting condition setting unit 11, a veneer image acquisition unit 12, a defect detection unit 13, a quality rank sorting unit 14, a first totalization unit 15, a second totalization unit. 16, and a display control unit 17 as a functional configuration. In addition, the veneer sorting control device 10 includes a sorting condition storage unit 101 and a sorting result storage unit 102 as a storage medium. Note that, here, a configuration in which the veneer sorting control device 10 includes the sorting condition storage unit 101 and the sorting result storage unit 102 is illustrated, but the sorting condition storage unit 101 and the sorting result storage unit 102 may be provided as an external storage device of the veneer sorting control device 10.

The respective functional blocks 11 to 17 can be configured by any of hardware, a digital signal processor (DSP), and software. For example, when being configured by software, the respective functional blocks 11 to 17 are actually provided with a CPU, a RAM, a ROM, and the like of a computer, and are realized when a veneer sorting control program stored in a storage medium such as the RAM, the ROM, a hard disk, and a semiconductor memory operates.

In addition, an image storage unit 100, an operation device 200, and a display device 300 are connected to the veneer sorting control device 10. The image storage unit 100 is an external storage device that stores a plurality of pieces of veneer image data (details thereof will be described later) obtained by imaging a surface in which a defect exists with respect to a plurality of veneers. For example, the operation device 200 is constituted by a keyboard, a mouse, a touch panel, or the like. For example, the display device 300 is constituted by a liquid crystal display, an organic EL display, or the like. The veneer sorting control device 10 of this embodiment analyzes the plurality of pieces of veneer image data stored in the image storage unit 100, and performs simulation relating to sorting of the plurality of veneers corresponding to the plurality of pieces of veneer image data into a plurality of quality ranks.

The sorting condition setting unit 11 sets a sorting condition when sorting veneers into a plurality of quality ranks in correspondence with a detection state of a defect of the veneers to be produced from log in a cutting system (not illustrated) for each of a plurality of kinds of defects. For example, the sorting condition setting unit 11 sets a condition of a value that is permissible in each quality rank for each of the plurality of kinds of defects in correspondence with a user's operation with respect to the operation device 200. Examples of the plurality of kinds of defect include holes and knot holes, pinholes, knots, chipping, cracks, lateral cracks (saw marks), veneer edge cracks, resin pocket, bark, fragile parts, scratch by cutting edge chipping, worm holes and beetle holes, mold, color unevenness, and the like. Examples of a value that can be set as a condition with respect to the defects include a size in a longitudinal direction of a rectangular veneer, a size in a veneer width direction, a number, an area, and the like. Note that, the kinds of the defects noted here is an example, and there is no limitation to the example.

FIG. 2 is a view illustrating a sorting condition setting example (part) for every defect by the sorting condition setting unit 11. Here, an example in the case of sorting veneers into three quality ranks including A, B, and C for each of a plurality of kinds of defects is illustrated. Quality is the highest in the rank A, and quality is the lowest in the rank C. As to be described later, veneers are sorted into any one of the quality ranks A to C by determining a quality rank result sorted for each of the plurality of kinds of defects overall. And, for example, a veneer sorted into the rank A is allocated to a face veneer of plywood, a veneer sorted into the rank B is allocated to a back veneer, and a veneer sorted into the rank C is allocated to a core veneer.

In FIG. 2, a value of a portion noted as "Min" represents a minimum value that is to be detected as a defect, and corresponds to a defect detection condition. Values of portions noted as "A", "B", and "C" represent maximum values permissible in respective quality ranks, and correspond to quality rank sorting conditions. For example, with regard to holes and knot holes (longitudinal diameter), detection of holes and knot holes having a size of 5 mm or greater in a longitudinal direction is set as a detection condition. In this case, with regard to holes and knot holes having a size smaller than 5 mm in the longitudinal direction, even in a case where the holes and knot holes exist on a veneer, the holes and knot holes are not detected as a defect.

In addition, in the example illustrated in FIG. 2, as the sorting condition, the rank A is set in a case where only holes and knot holes having a size of 30 mm or less in the longitudinal direction are detected, the rank B is set in a case where at least one of hole and knot hole having a size greater than 30 mm in the longitudinal direction is detected, but all the size is 50 mm or less, and the rank C is set in a case where at least one of hole and knot hole having a size greater than SC mm in the longitudinal direction is detected, but ail the size is 80 mm or less. Note that, in a case where at least one of hole and knot hole having a size greater than 80 mm in the longitudinal direction is detected, this case is set out of the quality ranks A to C.

Note that, the value of "Min" represents the defect detection condition as described above, and also represents a minimum value for sorting into the rank A. Accordingly, in the following description, the value of "Min" will also be described as one of quality rank sorting conditions.

As illustrated in FIG. 2, the sorting condition setting unit 11 generates a condition setting screen that can arbitrarily set quality rank sorting conditions (items of "Min", "A", "B", and "C") for each of a plurality of kinds of defects, supplies the condition setting screen to the display control unit 17, and causes the display device 300 to display the condition setting screen. In addition, the sorting condition setting unit 11 sets a sorting condition for each of the plurality of kinds of defects on the basis of a value that is input to the condition setting screen through a user's operation with respect to the operation device 200. In addition, the sorting condition setting unit 11 stores information of the set sorting condition in the sorting condition storage unit 101. Note that, the sorting condition setting unit 11 can also set whether or not to detect which defect among the plurality of kinds of defects as the detection condition through the user's operation with respect to the operation device 200.

The veneer image acquisition unit 12 acquires a plurality of pieces of veneer image data from the image storage unit 100. As described above, the veneer image data stored in the image storage unit 100 is image data obtained by imaging a surface in which a defect exists with respect to a plurality of veneers. Specifically, image data obtained by imaging a plane surface of the plurality of veneers actually produced in manufacturing a thin wooden board sheet by sheet by a camera is stored in the image storage unit 100.

Note that, the image storage unit 100 may store a plurality of pieces of veneer image data in an aspect capable of being identified for every producing area and/or every kind of tree of log that is a producing source of the veneers. For example, when a plurality of veneers from log relating to a specific producing area and a specific kind of tree are produced, a plurality of pieces of veneer image data obtained by imaging the veneers are stored in one folder. On another day, when a plurality of veneers from a log relating the same producing area and the same kind of tree are produced, a plurality of pieces of veneer image data obtained by imaging the veneers may be additionally stored in the same folder.

Similarly, captured image data of a plurality of veneers produced from log (the kind of tree may be same or may be different) relating to an arbitrary specific producing area may be collectively stored in one folder, or captured image data of a plurality of veneers produced from log (the producing area may be the same or may be different) relating to an arbitrary specific kind of tree may be collectively stored in one folder. In addition, here, description has been given of an example in which veneer image data is identified by dividing the veneer image data into folders, but the veneer image data may be identified by applying predetermined identification information to each veneer image data.

As described above, in a case where the plurality of pieces of veneer image data are stored in the image storage unit 100 in an aspect capable of being identified for every producing area and/or every kind of tree of log that is a producing source of the veneers are stored, the veneer image acquisition unit 12 may designate at least one of the producing area and the kind of tree of the log that is a producing source of the veneers, and may selectively acquire a plurality of pieces of veneer image data relating to the designation content from the image storage unit 100. The kind or the degree of a defect that occurs in veneers produced from log tends to be different in accordance with the producing area or the kind of tree of the log. Therefore, at least one of the producing area and the kind of tree of the log is designated, and veneer image data corresponding to the designation content is acquired to perform analysis to be described later. In this case, a quality rank sorting simulation by image analysis can be performed in conformity to the producing area and/or the kind of tree of the log from which the veneers are actually produced, and a result of the simulation can be made to be close to an actual sorting result.

The defect detection unit 13 detects a plurality of kinds of defects from each piece of veneer image data by performing image analysis on the plurality of pieces of veneer image data acquired by the veneer image acquisition unit 12. At this time, the defect detection unit 13 detects only a defect that satisfies the detection condition set by the sorting condition setting unit 11. In addition, with regard to a kind of defect in which a defect size is set as a sorting condition, the defect detection unit 13 also detects the defect size. For example, with regard to a hole and knot hole defect exemplified in FIG. 2, a defect in which a size in a longitudinal direction is 5 mm or greater and a size in a sheet width direction is 5 mm or greater is detected, and the size in the longitudinal direction and the size in the sheet width direction are also detected.

The quality rank sorting unit 14 determines a quality rank, tor each of a plurality of kinds of defects (hereinafter, referred to as "defect-based quality ranks") with respect to the plurality of pieces of veneer image data acquired by the veneer image acquisition unit 12 in accordance with the sorting condition set by the sorting condition setting unit 11 on the basis of a detection state (a defect, size, the number of defects, and the like) of the plurality of kinds of defects detected by the defect detection unit 13, determines the defect-based quality ranks overall, and sorts veneers corresponding to the plurality of pieces of veneer image data into a plurality of quality ranks (hereinafter, referred to as "overall quality ranks"). The quality rank sorting unit 14 stores information of the defect-based quality ranks which are determined for each of the plurality of kinds of defects, and information of the overall quality ranks obtained by determining the defect-based quality ranks in the sorting result, storage unit 102.

With regard to determination of the defect-based quality ranks with respect to each of the plurality of pieces of veneer image data in accordance with the sorting condition set by the sorting condition setting unit 11 is as described above with reference to FIG. 2. On the other hand, with regard to determination of the overall quality ranks by using the defect-based quality ranks (sorting of veneers corresponding to veneer image data into a plurality of quality ranks), for example, it is possible to use a method of determining the overall quality ranks of veneers in accordance with a predetermined function for weighting and averaging the defect-based quality tanks. Note that, a weighting value for each defect in this case may be adjusted by a user by operating the operation device 200.

Alternatively, the weighting value of each defect may be variably set in accordance with how close the size or the number of defects detected by the defect detection unit 13 to a permissible value of the quality rank set as the sorting condition. For example, with regard to a defect sorted into a certain quality rank, it is possible to variably set the weighting value of each defect by a method of setting the weighting value so that the greater the number of detected defects close to the permissible value of the quality rank is, the further the weighting value decreases, and the smaller the number of detected defects close to the permissible value is, the further the weighting value increases. Note that, here, the overall determination method of the quality rank is illustrative only, and there is no limitation thereto.

The first totalization unit 15 corresponds to a totalization unit in the claims, and totalizes the numbers or number ratios of veneers corresponding to a plurality of quality tanks (overall quality ranks) sorted by the quality rank sorting unit 14 with respect to the plurality of pieces of veneer image data acquired by the veneer image acquisition unit 12. For example, the first totalization unit 15 totalizes how many veneers corresponding to how many pieces of veneer image data among the plurality of pieces of veneer image data acquired by the veneer image acquisition unit 12 are sorted into the rank A in the overall quality ranks, how many veneers corresponding to how many pieces of veneer image data are sorted into the rank B, how many veneers corresponding to how many pieces of veneer image data are sorted into the rank C, and how may veneers corresponding to how many pieces of veneer image data are sorted into out of rank. In addition, the first totalization unit 15 totalizes number ratios of the veneers sorted into the rank A, the rank B, the rank C, and out of rank.

The second totalization unit 16 totalizes the numbers or number ratios of veneers corresponding a plurality of quality ranks for every defect for each of a plurality of kinds of defects on the basis of the quality rank (defect-based quality ranks) for each of the plurality of kinds of defects determined by the quality rank sorting unit 14 with respect to the plurality of pieces of veneer image data acquired by the veneer image acquisition unit 12. That is, for each of the plurality of quality ranks for every defect, the second totalization unit 16 totalizes the number or the number ratio of veneers in which a defect in a defect-based quality ranks are detected for each of the plurality of kinds of defects.

Referring to the example in FIG. 2, with regard to the hole and knot hole (longitudinal diameter) defect, the second totalization unit 16 totalizes the number, of veneers sorted of which the defect-based quality ranks are sorted into the rank A, the number of veneers of which the defect-based quality ranks are sorted into the rank B, and the number of veneers of which the defect-based quality ranks are sorted into the rank C, respectively. In addition, with regard to the hole and knot hole (sheet width diameter) defect, the second totalization unit 16 totalizes the number of veneers of which the defect-based quality ranks are sorted into the rank A, the number of veneers of which the defect-based quality ranks are sorted into the rank B, and the number of veneers of which the defect-based quality ranks are sorted into the rank C. The second totalization unit 16 may further totalize a number ratio of the veneers sorted into the ranks A to C. This is also true of the other kinds of defects.

The display control unit 17 displays the result totalized by the first totalization unit 15 and the result totalized by the second totalization unit 16 on a screen of the display device 300 in accordance with a display instruction given for the operation device 200 by a user's operation. At this time, the display control unit 17 selectively displays the result totalized by the first totalization unit 15 and the result totalized by the second totalization unit 16 on the screen.

Figure 3:
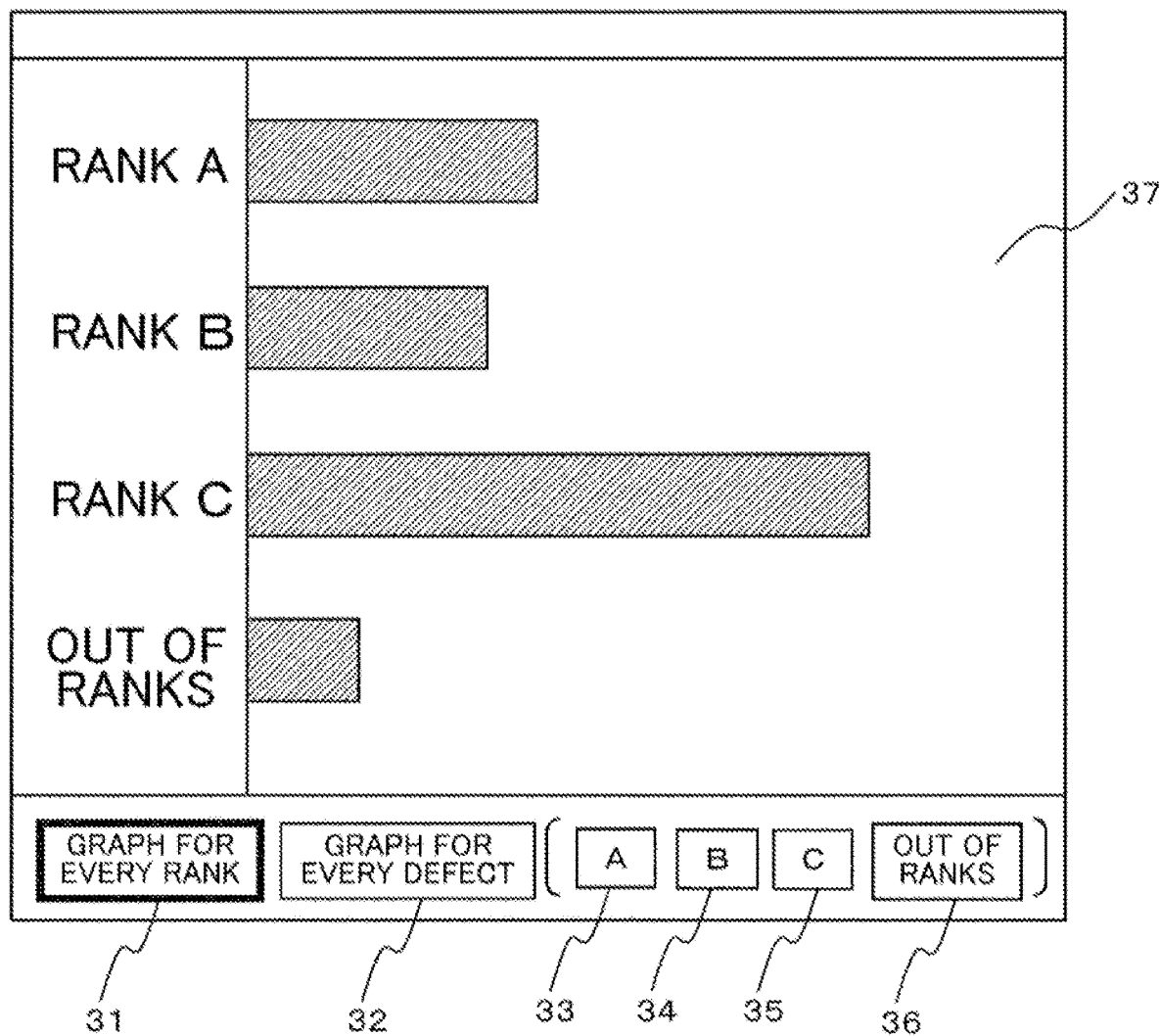
FIG. 3 is a view illustrating a display example of a result totalized by a first totalization unit.
Figure 4:
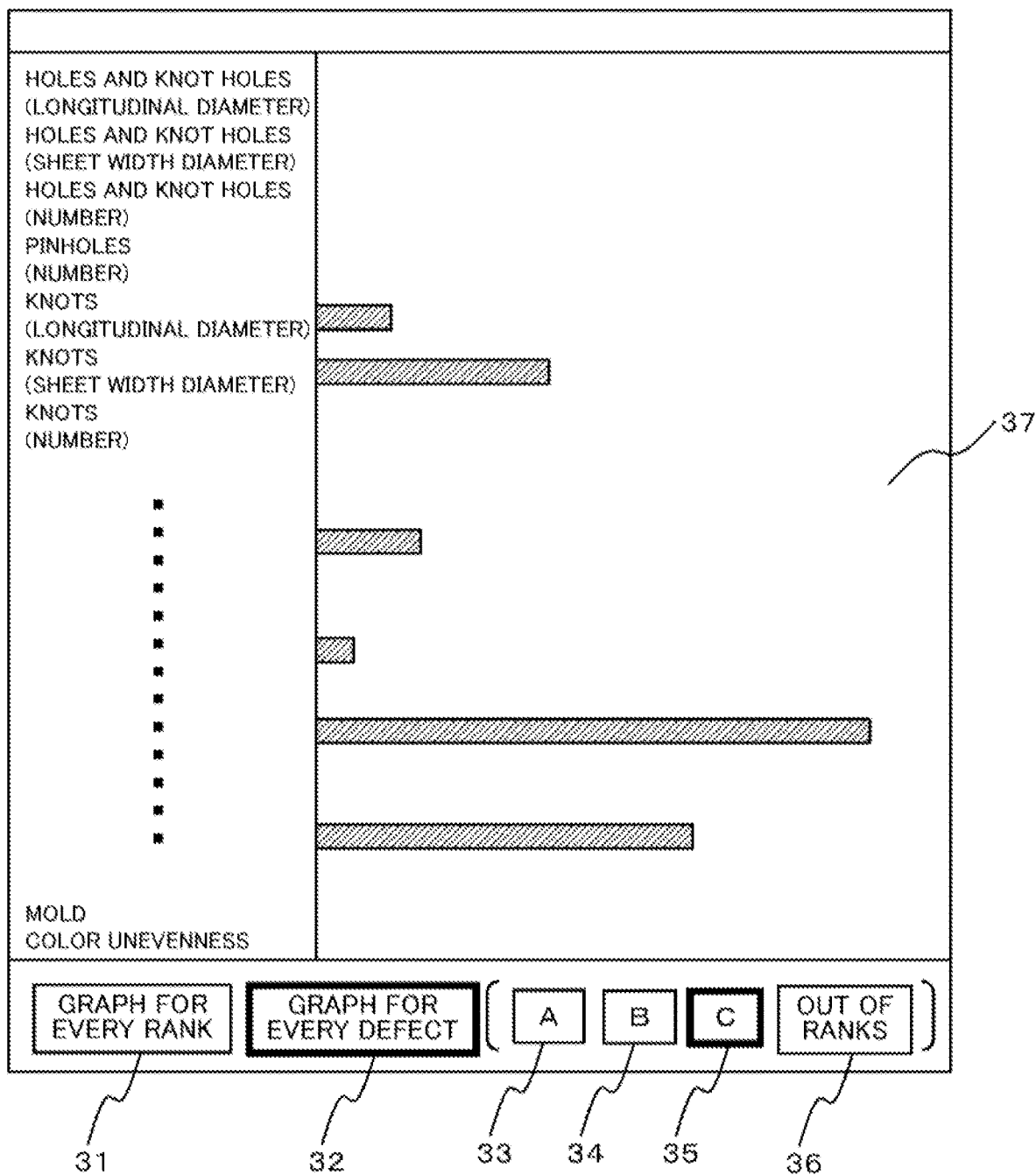
FIG. 4 is a view illustrating a display example of a result totalized by a second totalization unit.

FIG. 3 is a view illustrating a display example of the result (hereinafter, referred to as "first totalization result") totalized by the first totalization unit 15. FIG. 4 is a view illustrating a display example of the result (hereinafter, referred to as "second totalization result") totalized by the second totalization unit 16. Screen examples illustrated in FIG. 3 and FIG. 4 are provided with an every rank graph button 31, an every defect graph button 32, and rank designation buttons 33 to 36. When pressing the every rank graph button 31, the first totalization result totalized by the first totalization unit 15 is displayed in a graph display section 37. When pressing the every defect graph button 32 and designating any one quality ranks by the rank designation buttons 33 to 36, the second totalization result totalized by the second totalization unit 16 with regard to the designated quality rank is displayed in the graph display section 37.

In the example illustrated in FIG. 3, the numbers of veneers sorted into the plurality of overall quality ranks (including out-of-rank) by the quality rank sorting unit 14 with respect to the plurality of pieces of veneer image data are displayed in a bar graph type. A user can confirm whether or not the numbers of veneers sorted into the plurality of overall quality ranks become preferred number ratios as a result of arbitrarily setting the sorting condition for every defect by the sorting condition setting unit 11 by causing the graph to display in the graph display section 37. In a case where the preferred number ratios are not obtained, sorting and totalization of quality ranks are performed again by changing the sorting condition that is set for every defect, and the first totalization result is displayed again in the graph display section 37. According to this, it is possible to confirm whether or not the number ratios of veneers sorted into the plurality of overall quality ranks are improved as a result of changing the setting of the sorting condition.

Note that, here, description has been given of an example in which the numbers of veneers sorted into the plurality of overall quality ranks are displayed in the bar graph type, but there is no limitation thereto. For example, the number ratios of veneers sorted into the plurality of overall quality ranks may foe displayed in a m-chart type. In addition, the numbers or the number ratios of the veneers sorted into the plurality of overall quality ranks may be displayed in a numerical value type instead of the graph type. It is also possible to display the second totalization result illustrated in FIG. 4 in the numerical value type.

In the example illustrated in FIG. 4, the number of veneers of which the defect-based quality ranks are sorted into the rank C by the quality rank sorting unit 14 with respect to the plurality of pieces of veneer image data is displayed in a bar graph type for every kind of defect. In the screen example in FIG. 4, the names of the plurality of kinds of defects are displayed in a vertical axis direction (screen upper and lower direction) in parallel, and the number of veneers of which the defect-based quality ranks are sorted into the rank C is displayed in a bar graph type on the right side of each name. Kinds of defects for which the bar graphs are displayed are only kinds of defects that are set by the sorting condition setting unit 11 to ones to be detected.

In the example illustrated in FIG. 3, because the number of veneers of which the overall quality rank is sorted into the rank C is larger than the number of veneers of the other cases, a decrease in the number of the rank C is considered. In this case, as illustrated in FIG. 4, when displaying graphs in which the number of veneers of which the defect-based quality ranks are sorted into the rank C is illustrated for every kind of defect, it is possible to understand that a sorting condition of which kind of defect is to be relaxed so as to reduce the number sorted into the rank C. Description of "the sorting condition of the defect is relaxed so as to reduce the number sorted into the rank C" represents that a permissible value that is set as a sorting condition of the rank E is enlarged. When changing the sorting condition as described above, the number of veneers sorted of which the defect-based quality ranks are sorted into the rank B increases, and the number of veneers of which the defect-based quality ranks are sorted into the rank C decreases.

Note that, when designating the rank A or the rank B by the rank designation button 33 or 34, a bar graph illustrating the number of veneer of which the defect-based quality ranks are sorted into the rank A or the rank B for every kind of defect is displayed in the graph display section 37. In order to reduce the number of veneers of which the overall quality rank sorted into the rank C, an increase in the number of veneers of which the defect-based quality ranks are sorted into the rank A or the rank B may be considered. In this case, a graph for every defect may be displayed by designating the rank A or the rank B by the rank designation button 33 or 34 to understand the kind of a small number of defects sorted into the rank A or the rank B, and a sorting condition of this kind of defect may be adjusted.

As described above, when the graph for every rank as illustrated in FIG. 3, and the graph for every defect as illustrated in FIG. 4 are appropriately selected and displayed on a screen, a user can understand how to adjust a sorting condition relating to which kind of defect in order that the number of veneers sorted into the plurality of overall quality ranks can be made to be close to a preferred ratio. In addition/the user can adjust sorting conditions relating to a plurality of kinds of defect while considering that which kind of defect is emphasized to a certain extent. At this time, with regard to a kind of defect for which a condition cannot be relaxed, after strictly setting a sorting condition (so that the defect-based quality ranks are sorted into the rank A or the rank B as much as possible), a sorting condition relating to another kind of defect is adjusted. According to this, it is possible to make number ratios of veneers sorted into the plurality of overall quality ranks be close to preferred ratios in a simple manner.

Note that, here, as illustrated in FIG. 3 and FIG. 4, description has been given of an example in which the graph foe every rank (first totalization result) and the graph for every defect (second totalization result) are selectively displayed, but the display method is not limited thereto. For example, the display device 300 may be divided into two screens, and the graph for every rank and the graph for every defect may be simultaneously displayed. In addition, with regard to the graph for every defect, graphs of a plurality of quality ranks may be simultaneously displayed instead of selectively displaying the graphs of the plurality of quality ranks. In this case, the graphs of the plurality of quality ranks may be simultaneously displayed in a screen division manner, or the graphs of the plurality of quality ranks may be displayed in parallel for each of a plurality of kinds of defects.

After setting the sorting condition of the quality rank for every defect by simulation using the plurality of pieces of veneer image data, a cutting system is actually operated in accordance with the set sorting condition to sort a plurality of veneers produced from log into a plurality of quality ranks. In addition, the plurality of veneers produced are distributed to a plurality of deposition sites and are deposited on the basis of the sorting result. As a method of setting the sorting condition set in the veneer sorting control device 10 to the cutting system, it is possible to use a method of copying data stored in the sorting condition storage unit 101 to a removable storage medium and transmitting the data from the removable storage medium to the cutting system, to be stored.

Here, an example of a sorting condition setting procedure by the sorting condition setting unit 11 will be described. The setting procedure is arbitrarily. However, for example, the sorting condition may be set in the following procedure. First, the kind of defect to be detected and a sorting condition in the defect-based quality ranks are set in consideration of the use (a final product to be manufactured by using plywood, and the like) of a veneer to be produced and quality of a veneer to be produced according to the use. In this step (hereinafter, referred to as "quality priority step"), a sorting condition in which a priority is given to an improvement of quality of individual veneers produced rather than making the number of veneers which are sorted into a plurality of overall quality ranks close to a desired number ratio may be set. In addition, simulation is performed in accordance with the sorting condition set in this manner, and a quality rank sorting totalization result (a first totalization result) is confirmed.

When setting the sorting condition with a priority being given to the veneer quality, a veneer image based on veneer image data may be displayed on the display device 300 in combination with a defect detection result so as to confirm whether or not a defect, to be detected can be accurately detected by the defect detection unit 13. For example, as illustrated in FIG. 5, a veneer image 50 is displayed on the display device 300, and predetermined identification images 51 to 54 (for example, a plurality of kinds of identification images of which display aspects are different in accordance with the kind of defects such as a rectangular frame image that surrounds a defect, an edge image extracted in accordance with a defect shape, and a filled image) representing defects detected by the defect detection unit 13 may be displayed in a state of being imposed on the veneer image 50.

Figure 5:
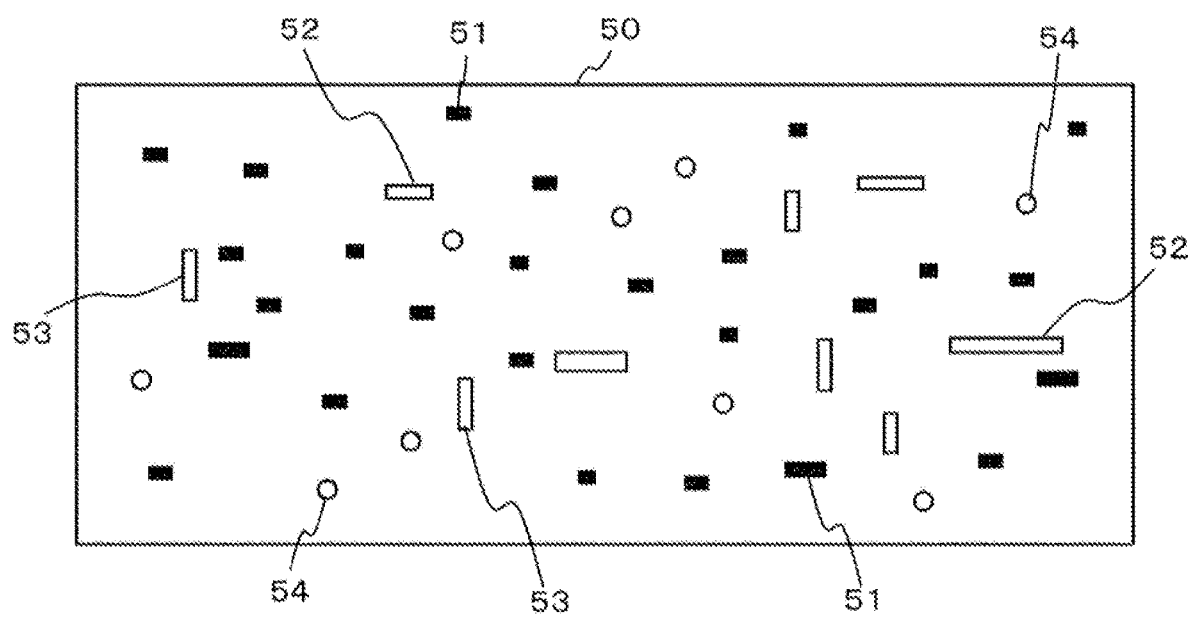
FIG. 5 is a view illustrating an example in which an image of a veneer and a defect detection result are displayed in combination.

A user views images displayed as in FIG. 5 and can confirm whether or not a kind of defect to be detected is intentionally detected. In addition, in a case where it is determined that the defect is not appropriately detected, the sorting condition is adjusted, and the simulation is performed again. Note that, in the quality priority step, it is not necessary to perform simulation by using all pieces of veneer image data to be used in simulation in the following output ratio adjustment step, and the simulation may be performed by using only a part of the pieces of veneer image data.

Due to the simulation in the above-described quality priority step, in a case where it is determined that a constant quality is provided and a defect can be extracted, a sorting condition is adjusted for making the number of veneers sorted into a plurality of overall quality ranks close to a desired number ratio. In the simulation in the output ratio adjustment step, among a plurality of kinds of defects to be detected, with regard to a kind of defect with a high priority, it is preferable that the number of veneers sorted is made to be the desired number ratio by maintaining the sorting condition set in the simulation in the quality priority step as much as possible, and by changing sorting conditions relating to the other defects.

As described above in detail, in the first embodiment, detection of defects and sorting of veneers into respective quality ranks are performed by using a plurality of pieces of veneer image data stored in the image storage unit 100, and a result totalized by using sorting results is displayed on a screen. According to this, in a case where it is determined that, number ratios of veneers which are confirmed through screen display are not appropriate, after sorting conditions are adjusted while considering that which kind of defect is emphasized to a certain extent, detection of the defects and sorting of the veneers into the respective quality ranks are performed again by using the plurality of pieces of veneer image data, and totalization results of respective quality ranks are displayed on the screen. Accordingly, an adjustment result of the sorting conditions can be confirmed.

As described above, according to this embodiment, it is not necessary to sequentially sort a plurality of veneers which are actually produced into a plurality of quality ranks, adjust sorting conditions for defects by an operator with reference to the sorting result, and then perform work of confirming whether or not sorting of the plurality of veneers which are actually produced under the adjusted sorting conditions into the respective quality ranks is appropriately performed, and adjustment of the sorting conditions can be performed by only processing on a computer with respect to the plurality of pieces of veneer image data stored in the image storage unit IOC. According to this, adjustment of the sorting conditions for appropriately sorting the plurality of veneers to be produced into the plurality of quality ranks can be performed within a short time.

In the above-described first embodiment, a veneer that is a target may be in a non-dried state that is cut by a veneer lathe and is cut to a standard size, or may be in a dried state having a standard size. This is also true of a second embodiment to be described later.

Second Embodiment

Figure 6:
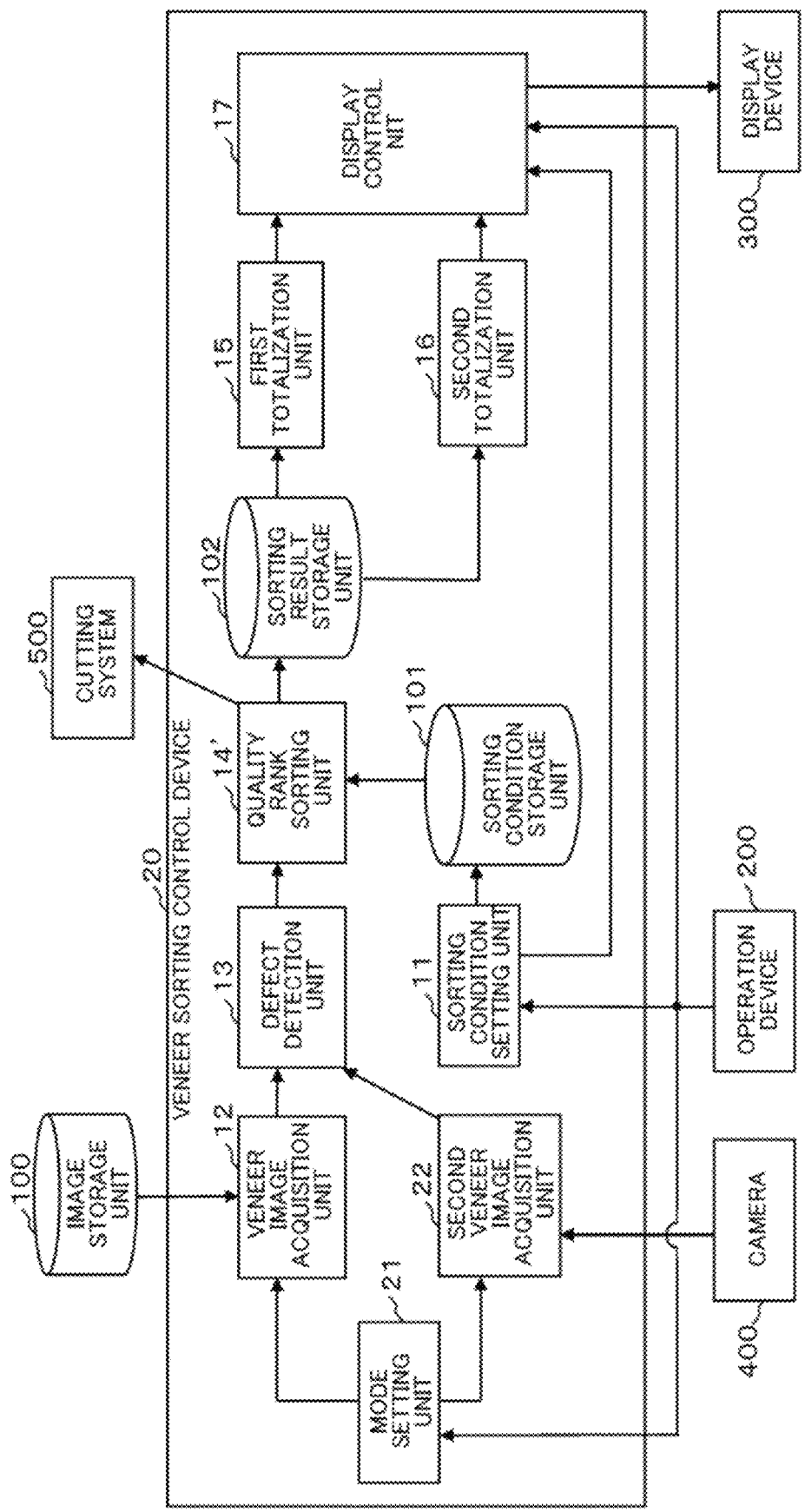
FIG. 6 is a block diagram illustrating a functional configuration example of a veneer sorting control device according to a second embodiment.

Next, a second embodiment of the invention will be described with reference to the accompanying drawings. FIG. 6 is a block diagram illustrating a functional configuration example of a veneer sorting control device 20 according to the second embodiment. Note that, in FIG. 6, a constituent element to which the same reference numeral as in FIG. 1 is given has the same function, and thus redundant description will be omitted here.

As illustrated in FIG. 6, the veneer sorting control device 20 according to the second embodiment further includes a mode setting unit 21 and a second veneer image acquisition unit 22 as a functional configuration. In addition, the veneer sorting control device 20 according to the second embodiment includes a quality rank sorting unit 14' instead of the quality rank sorting unit 14 illustrated in FIG. 1. In addition, the veneer sorting control device 20 according to the second embodiment is connected to a camera 400 and a cutting system 500.

The cutting system 500 is a system that cuts log to produce veneers, and includes a veneer lathe that cuts the log, a conveyor that conveys veneers produced through cutting by the veneer lathe, and a deposition field that deposits the veneers conveyed by the conveyor. The deposition field has a plurality of spaces for separating and depositing veneers sorted into a plurality of quality ranks. The cutting system 500 distributes a plurality of veneers sequentially conveyed on the conveyor sheet by sheet to any one space in correspondence with the quality ranks sorted by the veneer sorting control device 20. The cutting system 500 also includes a distribution mechanism for the purpose.

The camera 400 is provided near the cutting system 500, and images a surface of each of the veneers produced by the cutting system 500. For example, the camera 400 is provided at a position above the conveyor (upstream of the distribution mechanism) that conveys the veneer produced through cutting in the veneer lathe to each deposition field in a direction of imaging a conveyor direction, and sequentially images the veneers conveyed on the conveyor sheet by sheet.

The second veneer image acquisition unit 22 sequentially acquires veneer image data obtained by imaging a surface (veneer surface) in which a defect exists with the camera 400 with respect to the veneers which are actually produced by the cutting system 500 (as described above, the veneers conveyed on the conveyor).

The mode setting unit 21 sets either a simulation mode or an execution mode as an operation mode of the veneer sorting control device 20 through a user's operation with respect to the operation device 200. The simulation mode is an operation mode of performing a plurality of kinds of processing of the defect detection unit 13, the quality rank sorting unit 14', the first totalization unit 15, and the second totalization unit 16 by using the plurality of pieces of veneer image data acquired from the image storage unit 100 by the veneer image acquisition unit 12. The simulation mode is an operation mode of performing the processing described in the first embodiment.

That is, in a case where the simulation mode is set by the mode setting unit 23, the plurality of kinds of processing of the defect detection unit 13, the quality rank sorting unit 14', the first totalization unit 15, and the second totalization unit 16 are performed by using the plurality of pieces of veneer image data acquired from the image storage unit 100 by the veneer image acquisition unit 12 in accordance with sorting conditions set by the sorting condition setting unit 11 sorting conditions in adjustment which are stored in the sorting condition storage unit 101). In addition, in a case where an instruction for display of a totalization result is given by a user's operation with respect to the operation device 200, the display control unit 17 selectively or simultaneously displays the totalization result by the first totalization unit 15 and the totalization result toy the second totalization unit 16 on the display device 300.

On the other hand, the execution mode is an operation mode of performing the plurality of kinds of processing of the defect detection unit 13, the quality rank sorting unit 14', the first totalization unit 15, and the second totalization unit 16 by using the veneer image data sequentially acquired piece by piece from the camera 400 by the second veneer image acquisition unit 22.

In the execution mode, the quality rank sorting unit 14' stores information of sorted defect-based quality ranks and information of overall quality ranks in the sorting result storage unit 102, and notifies the cutting system 500 of the information of the overall quality ranks. The cutting system 500 receives the notification, and appropriately operates the distribution mechanism to distribute a plurality of veneers sequentially conveyed on the conveyor to spaces of deposition fields corresponding to the overall quality ranks given in notification sheet by sheet.

In a case where the execution mode is set by the mode setting unit 21, the plurality of kinds of processing of the defect detection unit 13, the quality rank sorting unit 14', the first totalization unit 15, and the second totalization unit 16 are performed by using veneer image data sequentially acquired from the camera 400 by the second veneer image acquisition unit 22 in accordance with the sorting conditions (sorting conditions which are sorting conditions stored in the sorting condition storage unit 101 and are adjusted in setting of the simulation mode and are finally determined) set by the sorting condition setting unit 11. In addition, in a case where an instruction for display of a totalization result is given through a user's operation with respect to the operation device 200, the display control unit 17 causes the display device 300 to selectively or simultaneously display the totalization result obtained by the first totalization unit 15 and the totalization result obtained by the second totalization unit 16.

Here, the defect detection unit 13 and the quality rank sorting unit 14' perform each processing whenever the second veneer image acquisition unit 22 acquires veneer image data piece by piece. Whenever sorting of the quality ranks is performed with respect to one piece of veneer image data, the first totalization unit 15 and the second totalization unit 16 can add the sorting result and perform totalization again. Alternatively, whenever sorting of the quality ranks with respect to two or more predetermined pieces of veneer image data is performed, the sorting results may be added and totalization may be performed again. In these cases, during display of the totalization result on the display device 300 in correspondence with a user's instruction, whenever sorting of quality ranks with respect to one or predetermined pieces of veneer image data is performed, the content of a displayed graph is updated.

As an additional example, whenever the second veneer image acquisition unit 22 acquires the veneer image data, only processing of the defect detection unit 13 and the quality rank sorting unit 14' may be sequentially performed, and only when instruction for the operation device 200 to display the totalization result, is given by a user's operation, the first totalization unit 15 and the second totalization unit 16 may perform totalization by using sorting result information kept, (stored) in the sorting result storage unit 102 at the instruction timing. In this case, before the user operates the operation device 200 to give an instruction for re-display, the content of the displayed graph is not updated and does not vary.

According to the above-described second embodiment, one piece of the veneer sorting control device 20 can be properly used in the simulation mode and the execution mode. As described above, in the operation by the simulation mode, the sorting conditions for every defect can be adjusted so that the number of veneers sorted into a plurality of overall quality ranks closes to a desired number ratio. However, since the veneer image data read out from, the image storage unit 100 is not image data obtained by imaging actually produced veneers, it is difficult to sort the veneers into the plurality of quality ranks to completely match the simulation result.

Therefore, after adjusting the sorting conditions in the simulation mode, when results sorted into the plurality of quality ranks in the execution mode in accordance with the sorting conditions are totalized and displayed with graphs, a user can confirm a discrepancy between a sorting result by the simulation and an actual sorting result. In addition, during execution of processing by the execution mode, the user can adjust the sorting conditions by operating the operation device 200 as necessary. Needless to say, the processing by the execution mode may be stopped once, and the sorting conditions may be adjusted again by setting the simulation mode.

Note that, during execution of the processing by the execution mode, when displaying a totalization result of sorting of the quality ranks, a result totalized by analyzing veneer image data read out from the image storage unit 100 in the simulation mode, and a result totalized by analyzing veneer image data acquired form the camera 400 in the execution mode may be arranged side by side simultaneously. In this case, the discrepancy between the sorting result by the simulation and the actual sorting result can be presented to the user in an easy-to-understand manner.

In the second embodiment, the veneer image data acquired by the second veneer image acquisition unit 22 may be stored in the image storage unit 100. In this case, the veneer image data acquired during processing of the execution mode can be utilized when performing the simulation of the quality rank sorting by setting the simulation mode later.

In addition, in the second embodiment, when performing the simulation in the quality priority step, several pieces of veneer image data imaged by the camera 400 (captured images of actually produced veneers) may be used instead of the veneer image data read out from the image storage unit 100.

In the first embodiment and the second embodiment, description has been given of the configuration provided with the first totalization unit 15 and the second totalization unit 16, but the invention is not limited to the configuration. For example, a configuration provided with only the first totalization unit 15 is also possible. In this case, only the graph for every rank illustrated in FIG. 3 is displayed. Even when displaying only the graph for every rank, it is possible to adjust the sorting conditions of the quality ranks so that the number ratio of the veneers sorted into a plurality of quality ranks closes to a preferred ratio while considering the degree of importance. However, when using the graph for every defect as illustrated in FIG. 4 in combination, it is easy to understand that sorting conditions relating to which type of detect should be adjusted, and thus this case is preferable from the viewpoint of more effectively performing adjustment of the sorting conditions.

In addition, in the first and second embodiments, description has been given of an example in which the quality ranks sorted are three kinds of A to C, but there is not limitation to the number. For example, sorting six quality ranks can be performed so that A1 and A2 are set as a quality rank that can be allocated to the face veneer, B1 and B2 are set as a quality rank that can be allocated to the back veneer, and C1 and C2 are set as a quality rank that can be allocated to the core veneer. Alternatively, sorting into four or five quality ranks such as A to D or A to E can be performed.

In addition, the first, and second embodiments illustrate only one example of embodiment when carrying out the invention, and the technical scope of the invention should not be analyzed in a limited manner. That is, the invention can be carried out in various aspects without departing from the gist or important characteristics.

REFERENCE SIGNS LIST 10, 20 Veneer sorting control device
11 Sorting condition setting unit
12 Veneer image acquisition unit
13 Defect detection unit
14, 14' Quality tank sorting unit
15 First totalization unit (totalization unit)
16 Second totalization unit
17 Display control unit
21 Mode setting unit
22 Second veneer image acquisition unit

The invention claimed is:

1. A veneer sorting control device comprising:
a sorting condition setting unit that sets sorting conditions in sorting of a veneer into a plurality of quality ranks for each of a plurality of kinds of defects in correspondence with a detection state of the defects;
a veneer image acquisition unit that acquires a plurality of pieces of veneer image data from an image storage unit that stores the plurality of pieces of veneer image data acquired by imaging a surface in which a defect exists with respect a plurality of the veneers;
a defect detection unit that detects the plurality of kinds of defects by performing image analysis on the plurality of pieces of veneer image data acquired by the veneer image acquisition unit;
a quality rank sorting unit that determines a defect-based quality rank for each of the plurality of kinds of defects with respect to the plurality of pieces of veneer image data acquired by the veneer image acquisition unit in accordance with the sorting conditions set by the sorting condition setting unit on the basis of detections states of the plurality of kinds of defects detected by the defect detection unit, determines the defect-based quality rank overall, and sorts veneers corresponding to the plurality of pieces of veneer image data into the plurality of quality ranks;
a totalization unit that totalizes the number or a number ratio of veneers corresponding to the plurality of quality ranks sorted by the quality rank sorting unit with respect to the plurality of pieces of veneer image data acquired by the veneer image acquisition unit; and
a display control unit that displays a result totalized by the totalization unit on a screen.

2. The veneer sorting control device according to claim 1, further comprising:
a second totalization unit that totalizes the number or a number ratio of veneers corresponding to a plurality of defect-based quality ranks for each of the plurality of kinds of defects on the basis of the defect-based quality ranks which are determined for each of the plurality of kinds of defects by the quality rank sorting unit with respect to the plurality of pieces of veneer image data acquired by the veneer image acquisition unit,
wherein the display control unit selectively or simultaneously displays the result totalized by the totalization unit, and a result totalized by the second totalization unit on the screen.

3. The veneer sorting control device according to claim 1,
wherein the veneer image acquisition unit designates at least one of a producing area and a kind of tree of log that is a producing source of veneers, and selectively acquires the plurality of pieces of veneer image data relating to the designation content from the image storage unit.

4. The veneer sorting control device according to claim 1, further comprising:
a second veneer image acquisition unit that sequentially acquires veneer image data obtained by imaging a surface in which a defect exists with respect to actually produced veneer; and
a mode setting unit that sets any one of a simulation mode or an execution mode,
wherein in a case where the simulation mode is set by the mode setting unit, processing of the defect detection unit, processing of the quality rank sorting unit, and processing of the totalization unit are performed in accordance with the sorting conditions set by the sorting condition setting unit by using the plurality of pieces of veneer image data acquired from the image storage unit by the veneer image acquisition unit, and the display control unit displays the totalization result by the totalization unit on the screen, and
in a case where the execution mode is set by the mode setting unit, processing of the defect detection unit, processing of the quality rank sorting unit, and processing of the totalization unit are performed in accordance with the sorting conditions set by the sorting condition setting unit by using the veneer image data that is sequentially acquired by the second veneer image acquisition unit, and whenever totalization by the totalization unit is sequentially performed, the display control unit updates the totalization result by the totalization unit and displays the totalization result on the screen.

5. A veneer sorting control method comprising:
a step of setting sorting conditions in sorting of a veneer into a plurality of quality ranks for each of a plurality of kinds of defects in correspondence with a detection state of the defects by a sorting condition setting unit of a computer;
a step of acquiring a plurality of pieces of veneer image data from an image storage unit that stores the plurality of pieces of veneer image data obtained by imaging a surface in which a defect exists with respect a plurality of the veneers by a veneer image acquisition unit of the computer;
a step of detecting the plurality of kinds of defects by performing image analysis on the plurality of pieces of veneer image data obtained by the veneer image acquisition unit by a defect detection unit of the computer;
a step of determining a defect-based quality rank for each of the plurality of kinds of defects with respect to the plurality of pieces of veneer image data acquired by the veneer image acquisition unit in accordance with the sorting conditions set by the sorting condition setting unit on the basis of detections states of the plurality of kinds of defects detected by the defect detection unit, determining the defect-based quality rank overall, and sorting veneers corresponding to the plurality of pieces of veneer image data into the plurality of quality ranks by a quality rank sorting unit of the computer;

a step of totalizing the number or a number ratio of veneers corresponding to the plurality of quality ranks sorted by the quality rank sorting unit with respect to the plurality of pieces of veneer image data acquired by the veneer image acquisition unit by a totalization unit of the computer; and a step of displaying a result totalized by the totalization unit on a screen by a display control unit of the computer.

6. A veneer sorting control program stored in a non-transitory computer readable storage medium causing a computer to function as:

a sorting condition setting means that sets sorting conditions in sorting of a veneer into a plurality of quality ranks for each of a plurality of kinds of defects in correspondence with a detection state of the defects;

a veneer image acquisition means that acquires a plurality of pieces of veneer image data from an image storage unit that stores the plurality of pieces of veneer image data obtained by imaging a surface in which a defect exists with respect a plurality of the veneers;

a defect detection means that detects the plurality of kinds of defects by performing image analysis on the plurality of pieces of veneer image data obtained by the veneer image acquisition means;

a quality rank sorting means that determines a defect-based quality rank for each of the plurality of kinds of defects with respect to the plurality of pieces of veneer image data acquired by the veneer image acquisition means in accordance with the sorting conditions set by the sorting condition setting means on the basis of detections states of the plurality of kinds of defects detected by the defect detection means, determines the defect-based quality rank overall, and sorts veneers corresponding to the plurality of pieces of veneer image data into the plurality of quality ranks;

a totalization means that totalizes the number or a number ratio of veneers corresponding to the plurality of quality ranks sorted by the quality rank sorting means with respect to the plurality of pieces of veneer image data acquired by the veneer image acquisition means; and a display control means that displays a result totalized by the totalization means on a screen.

7. The veneer sorting control device according to claim 2, wherein the veneer image acquisition unit designates at least one of a producing area and a kind of tree of log that is a producing source of veneers, and selectively acquires the plurality of pieces of veneer image data relating to the designation content from the image storage unit.

8. The veneer sorting control device according to claim 2, further comprising:

a second veneer image acquisition unit that sequentially acquires veneer image data obtained by imaging a surface in which a defect exists with respect to actually produced veneer; and a mode setting unit that sets any one of a simulation mode or an execution mode, wherein in a case where the simulation mode is set by the mode setting unit, processing of the defect detection unit, processing of the quality rank sorting unit, and processing of the totalization unit are performed in accordance with the sorting conditions set by the sorting condition setting unit by using the plurality of pieces of veneer image data acquired from the image storage unit by the veneer image acquisition unit, and the display control unit displays the totalization result by the totalization unit on the screen, and in a case where the execution mode is set by the mode setting unit, processing of the defect detection unit, processing of the quality rank sorting unit, and processing of the totalization unit are performed in accordance with the sorting conditions set by the sorting condition setting unit by using the veneer image data that is sequentially acquired by the second veneer image acquisition unit, and whenever totalization by the totalization unit is sequentially performed, the display control unit updates the totalization result by the totalization unit and displays the totalization result on the screen.

9. The veneer sorting control device according to claim 3, further comprising:

a second veneer image acquisition unit that sequentially acquires veneer image data obtained by imaging a surface in which a defect exists with respect to actually produced veneer; and a mode setting unit that sets any one of a simulation mode or an execution mode, wherein in a case where the simulation mode is set by the mode setting unit, processing of the defect detection unit, processing of the quality rank sorting unit, and processing of the totalization unit are performed in accordance with the sorting conditions set by the sorting condition setting unit by using the plurality of pieces of veneer image data acquired from the image storage unit by the veneer image acquisition unit, and the display control unit displays the totalization result by the totalization unit on the screen, and in a case where the execution mode is set by the mode setting unit, processing of the defect detection unit, processing of the quality rank sorting unit, and processing of the totalization unit are performed in accordance with the sorting conditions set by the sorting condition setting unit by using the veneer image data that is sequentially acquired by the second veneer image acquisition unit, and whenever totalization by the totalization unit is sequentially performed, the display control unit updates the totalization result by the totalization unit and displays the totalization result on the screen.

* * * * *